May 8, 1962 G. H. MULLER ETAL 3,033,588
FRONT WHEEL CASTER AND CAMBER ADJUSTMENT MEANS
Filed Aug. 27, 1959 2 Sheets-Sheet 1
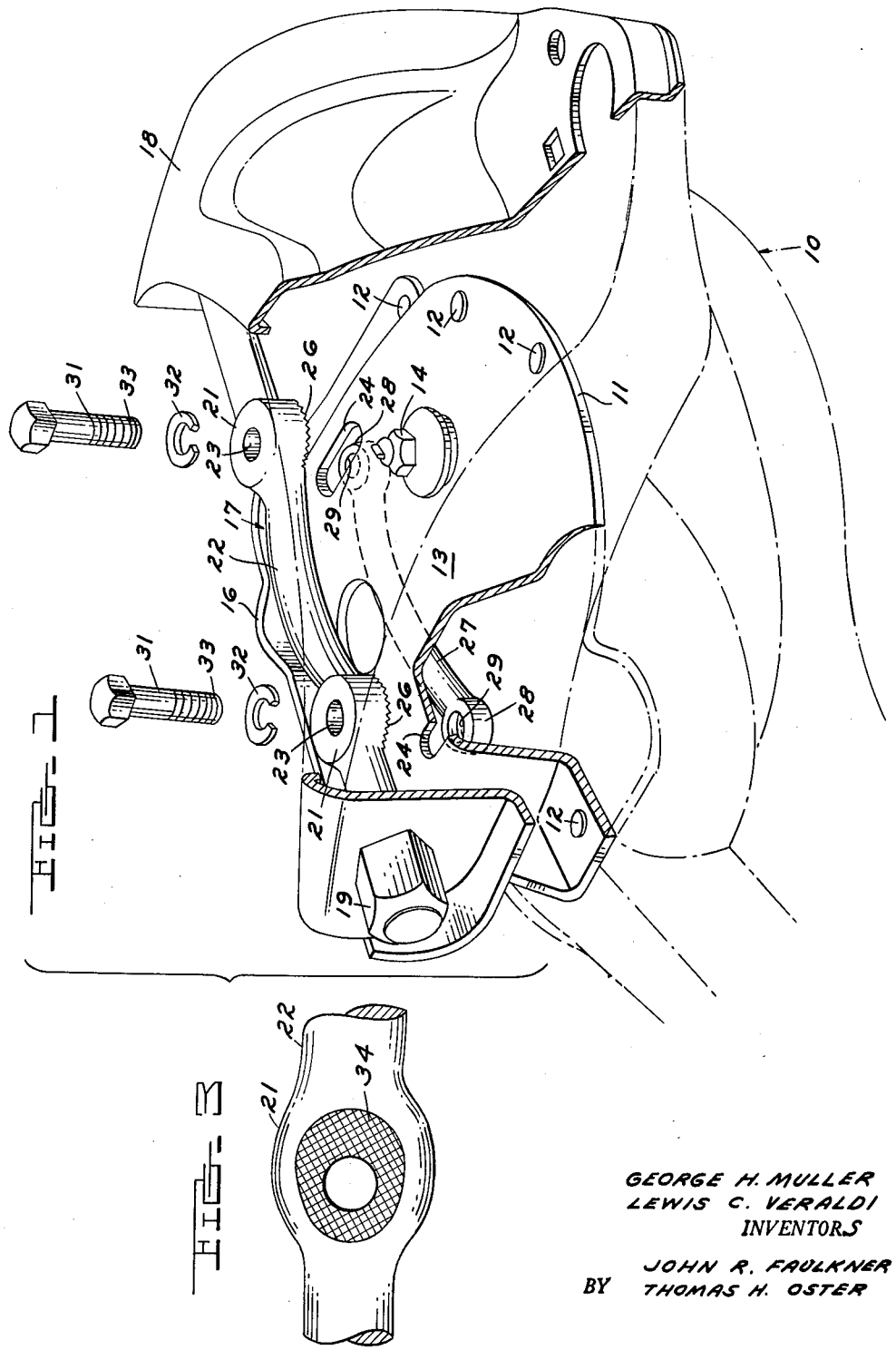
GEORGE H. MULLER
LEWIS C. VERALDI
INVENTORS
BY JOHN R. FAULKNER
THOMAS H. OSTER
ATTORNEYS May 8, 1962 G. H. MULLER ETAL 3,033,588
FRONT WHEEL CASTER AND CAMBER ADJUSTMENT MEANS
Filed Aug. 27, 1959 2 Sheets-Sheet 2
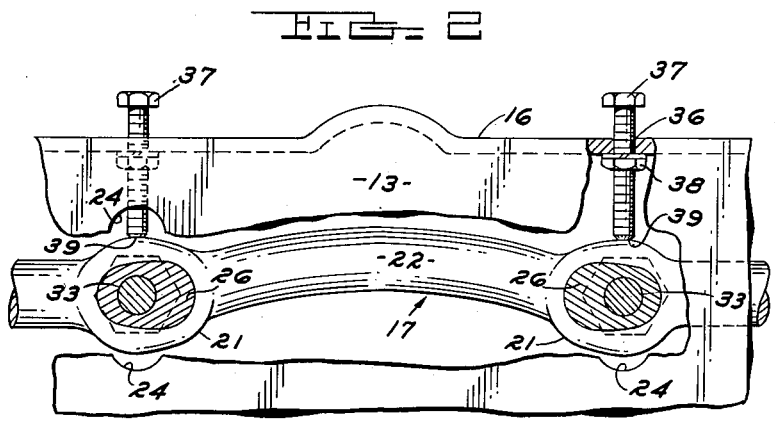
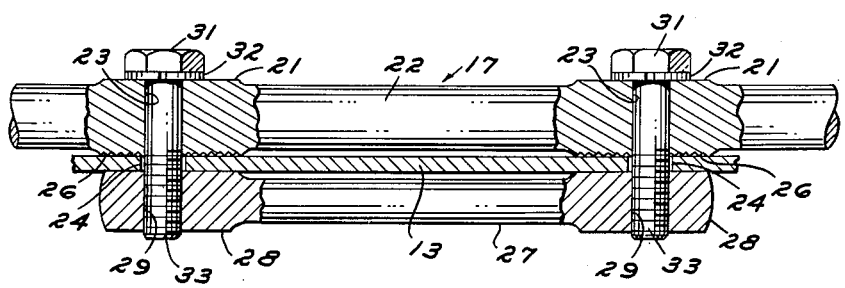
GEORGE H. MULLER
LEWIS C. VERALDI
INVENTOR.
BY JOHN R. FAULKNER
THOMAS H. OSTER
ATTORNEYS United States Patent Office 3,033,588
Patented May 8, 1962

3,033,588
FRONT WHEEL CASTER AND CAMBER ADJUSTMENT MEANS
George H. Muller, Northville, and Lewis C. Veraldi, Dearborn, Mich., assignors to Ford Motor Company, Dearborn, Mich., a corporation of Delaware
Filed Aug. 27, 1959, Ser. No. 836,354
4 Claims. (Cl. 280—96.2)

This invention relates to the front suspension arrangement of a motor vehicle and in particular is concerned with a new and novel arrangement of obtaining and maintaining an infinitely fine caster and camber adjustment of the front wheel of an independent suspension system.

In a number of suspensions, the caster and camber adjustment is obtained by the use of shims placed between the pivot bolt shaft and the frame support bracket. The use of shim stock has many disadvantages. In order to get a fine adjustment, an infinite number of shim sizes must be available and used by the assembly man. This is not practical in today's mass production. Furthermore, burrs on the shim edges can throw off the shim adjustment as can accumulated shim thickness tolerances. Shims usually become compressed by the loading of the front suspension thereby resulting in the loss of the adjustment. On occasion, one or more of the shims may work themselves loose and fall out of the assembly. This would, of course, throw off the adjustment resulting in wheel shimmy and the premature wear of the tires, hard steering, and car wander.

One of the principal objects of this invention, therefore, is to provide a structure which permits an infinitely fine caster and camber adjustment of the front wheels of an independent suspension system.

Another object of this invention is to provide a structure in which an accurate adjustment of the front wheel caster and camber in a motor vehicle independent front suspension system can be easily made and positively maintained for a substantial period of time.

Still another object of this invention is to provide adjustment means for making an accurate front suspension wheel caster and camber adjustment, said means being simple in design, easy to manufacture, low in cost, and easy to adjust.

Still a further object of this invention is to provide means for maintaining a caster and camber adjustment which requires a minimum of parts, which is reliable in operation, and which requires a minimum of assembly time.

Other objects and advantages of this invention will be made more apparent as this description proceeds, particularly when considered in connection with the accompanying drawings wherein:

FIGURE 1 is a fragmentary perspective exploded view partly in section of the upper part of a conventional independent suspension system embodying the invention;

FIGURE 2 is a fragmentary view partly in section taken from the underside of the frame support bracket with the locking plate removed;

FIGURE 3 is a fragmentary view of the underside of one of the hub-like portions of the upper pivot arm and showing an alternate form of serrations; and FIGURE 4 is a fragmentary view partly in section of an assembled upper suspension pivot arm shaft, frame support bracket and locking plate.

Referring now to the drawings and in particular FIGURE 1, the fragmentary upper portion of an independent suspension system is shown. Although only a portion of one of the front wheel independent suspensions is shown, it is to be understood that the other front wheel suspension is constructed in a like manner. Reference numeral 10 denotes the enlarged portion of the frame side rail and is shown in dash lines. Atop the side rail at this point is the frame support bracket 11 which is secured to the side rail by rivets 12 at the outer edge portions of the bracket. Frame support bracket 11 has a raised generally horizontally disposed embossment 13 to which is secured the shock absorber 14. Inboard of the side rail 10, the bracket 11 is formed with an upstanding side wall 16.

An upper suspension pivot arm shaft indicated generally at 17 is provided in a predetermined spaced apart relationship to the side wall 16. Shaft 17 is provided with conventional threaded end portions (not shown) upon which are mounted conventional resilient bushing assemblies 19 upon which is supported the upper suspension arm 18. By varying the relationship of the shaft 17 with respect to the wall 16, the proper caster and camber adjustment is obtained. This portion of the disclosure is well known in the art and is found in many of the currently manufactured independent suspension vehicles. The wheel supporting structure is also well known and does not require a detailed disclosure to understand this invention.

Applicants' invention is directed to the positive attachment of the upper pivot arm shaft 17 in a predetermined spaced apart relationship to the side wall 16. Shaft 17 has a pair of enlarged hub-like portions 21 joined by curved connecting portion 22. The enlarged hub-like portions 21 are provided with enlarged bores 23 axially aligned with elongated apertures 24 located in the embossment 13 of the frame support bracket 11. It can be seen, particularly in FIGURES 1, 2 and 4, that the shaft 17 may be moved and positioned with respect to any portion of the enlarged apertures 24 in order to obtain the proper caster and camber adjustment. The hub-like portions 21 are provided on their underside with case hardened projections indicated at 26. Projections, as herein intended, would include, among other things, knurls, ridges, serrations, grooves and all forms of jutting out configurations in which there is a sufficient sharpness to effect a bite or penetration into the bracket to obtain a mechanical lock. The area of the projections is sufficiently large so that a satisfactory mechanical lock of the bracket adjacent to the slotted holes 24 can take place.

Underlaying the frame support member 11 is a locking plate 27 having two hub-like end portions 28 which have threaded bores 29 substantially axially aligned with the elongated apertures 24. The distance between the center lines of the bores 23 in the shaft and the threaded bores 29 in the locking plate is the same. Shaft 17 is secured in position upon the frame support bracket 11 by a pair of bolt and lock washer means 31 and 32 respectively.

Referring now to FIGURE 4, threaded shank portion 33 of the bolt extends through the bore 23, slot 24 and threadably engages the bore 29 in the locking plate. By torquing the bolt 31 to the proper value, the hardened projections 26 will bite into the softer steel bracket embossment 13 thereby mechanically locking the pivot arm shaft to the bracket in the proper position. By the use of locking plate 27, a second wrench to hold separate nuts is avoided, positive locking of the bolts 31 is assured, and the caster and camber adjustment is positively maintained.

Referring to FIGURE 2, the projections 26 are in the form of a herringbone arrangement of grooves wherein the grooves in both hub-like portions 21 are angled toward the center of the shaft. This groove arrangement has been found to greatly increase the mechanical locking of the shaft upon the bracket. A conventional knurled pattern indicated at 34 in FIGURE 3 can also be used and will also maintain the pivot arm shaft in the secured position. The particular type of projection used is determined to a great extent by the type of equipment available in the manufacturer's plant.

Because of the normal wear and tear on a suspension system, occasional caster and camber adjustments must be made. These adjustments are greatly simplified by providing a pair of enlarged apertures 36 in the wall 16 in alignment with elongated apertures 24. Because the upper suspension arm pivot shaft and related parts will move inboard upon the loosening of the bolts 31, bolts 37 are extended through the apertures 36 to bottom against the hub-like portions 21 of the pivot arm shaft. Nut means 38 are supported by the wall 16 and are used to effect a change in length of the bolt threaded portion 39 extending outboard toward the hub-like portions 21. When a service adjustment is required in the caster or camber of the front suspension system, bolt means 31 are loosened. Clockwise or counterclockwise rotation of the bolt 37 while holding the nut means 38 from turning will either move the pivot shaft outboard or allow it to move inboard the required distance to effect the proper adjustment. Upon attaining the proper position, bolts 31 are torqued to cause the pivot shaft to grip the bracket.

It will be understood that the invention is not to be limited to the exact construction shown and described, but that various changes and modifications may be made without departing from the spirit and scope of the invention, as defined in the appended claims.

What is claimed is:

1. Caster and camber adjustment means for a motor vehicle independent front suspension having a frame side rail and an upper suspension arm, comprising a frame support bracket adapted to be secured to the frame side rail of the motor vehicle, an upper suspension arm pivot shaft adapted to pivotally support the upper suspension arm, a pair of bores in said pivot shaft, a pair of elongated apertures in said frame support bracket substantially aligned with said pair of bores in said pivot shaft, a locking member underlaying said frame support bracket and having a pair of threaded bores axially aligned with said pivot shaft bores, said pivot shaft having projections engaging said frame support bracket adjacent said elongated apertures, and threaded fastening means extending through said pivot shaft bores, frame support bracket elongated apertures and threadedly engaging the locking member bores whereby the pivot shaft projections will bite into the surface of said bracket.

2. Caster and camber adjustment means for a front road wheel of a motor vehicle independent front suspension comprising a frame support bracket adapted to be fixedly secured to a sprung portion of the motor vehicle and having a pair of spaced apart slotted holes which define a range of caster and camber adjustment, an upper suspension arm adapted to be mounted upon an unsprung portion of the motor vehicle, an upper suspension arm pivot shaft adapted to be journalled in the upper suspension arm and having a pair of bores substantially axially aligned with a part of the frame support bracket slotted holes, said upper suspension arm pivot shaft having hardened serrated areas for frictionally locking the interface surface of the frame support bracket, a locking plate disposed on the opposite side of the frame support bracket to said upper suspension arm pivot shaft having a pair of threaded apertures axially aligned with the bores in the upper suspension arm pivot shaft and substantially axially aligned with a part of the frame support bracket slotted holes, fastening means extending through said upper suspension arm pivot shaft bores and said frame support bracket slotted holes and engaging said locking plate threaded apertures whereby the torquing of said fastening means will cause the hardened serrated areas to penetrate the interface surface of the frame support bracket to frictionally lock said upper suspension arm pivot shaft in a predetermined position upon said bracket.

3. Caster and camber adjustment means for the front road wheel in a motor vehicle having an independent front suspension comprising a frame support bracket having an upstanding wall inboard of the road wheel and a generally horizontal section extending in an outboard direction to said wall and adapted to be secured to a sprung portion of the motor vehicle, said generally horizontal section having a pair of slotted apertures that define a range of caster and camber adjustment, a pivot shaft overlaying said frame support horizontal section and having at least one projection engaging said frame support bracket horizontal section, a locking plate underlaying said frame support bracket horizontal section, adjustable means supported upon said upstanding wall and bottoming against said pivot shaft to position said pivot shaft in the proper caster and camber position upon said frame support bracket horizontal section, and fastening means extending through said slotted apertures and clamping said pivot shaft and locking plate against said horizontal section whereby said projection mechanically interlocks the pivot shaft to said frame support bracket horizontal section.

4. Adjustment means for a front road wheel of a motor vehicle independent front suspension comprising a frame support bracket secured to the sprung portion of a motor vehicle and having a pair of spaced apertures therein, a suspension arm for said road wheel, a suspension arm pivot shaft pivotally supporting said suspension arm and having a pair of apertures in alignment with the apertures in said frame support bracket, one pair of said pairs of apertures being enlarged, said suspension arm pivot shaft having hardened projections for locking engagement with the adjacent surfaces of the frame support bracket, a locking plate disposed on the opposite side of said frame support bracket from said pivot shaft and having a pair of threaded apertures aligned with the apertures in said pivot shaft and said frame support bracket, fastening means extending through the bores in said pivot shaft and said frame support bracket and threadedly engaging the threaded apertures in said locking plate whereby the tightening of said fastening means will cause the hardened projections on said pivot shaft to interlock with the adjacent surface of said frame support bracket to hold said pivot shaft in a predetermined position upon said bracket.

References Cited in the file of this patent

UNITED STATES PATENTS

| | | |
|---|---|---|
| 2,162,828 | Slack | June 20, 1939 |
| 2,193,724 | Horton | Mar. 12, 1940 |
| 2,630,330 | Long | Mar. 3, 1953 |
| 2,674,465 | Carpezzi | Apr. 6, 1954 |
| 2,722,294 | Lagaard | Nov. 1, 1955 |
| 2,882,066 | Petrak | Apr. 14, 1959 |
| 2,890,062 | Perkins | June 9, 1959 |